United States Patent [19]

Oberth

[11] 4,050,969
[45] Sept. 27, 1977

[54] CATALYTIC SYSTEM AND POLYURETHANE PROPELLANTS

[75] Inventor: Adolf E. Oberth, Fair Oaks, Calif.

[73] Assignee: The United States of America as represented by the Secretary of the Air Force, Washington, D.C.

[21] Appl. No.: 727,723

[22] Filed: Sept. 29, 1976

[51] Int. Cl.$^2$ .............................................. C06B 45/10
[52] U.S. Cl. ...................................... 149/19.4; 149/76
[58] Field of Search ................................ 149/19.4, 76

[56] References Cited

U.S. PATENT DOCUMENTS 3,811,967  5/1974  Strickler et al. .................... 149/19.4

*Primary Examiner*—Stephen J. Lechert, Jr.
*Attorney, Agent, or Firm*—Joseph E. Rusz; William J. O'Brien

[57] ABSTRACT

A catalytic system for use in the formation of polyurethane propellants in which compounds of the type Fe(AA)$_2$X, where AA is the acetylacetonate radical and X is an acid radical. These compounds have been found to be valuable catalysts for promoting the alcohol-isocyanate reaction at room temperature.

4 Claims, No Drawings

CATALYTIC SYSTEM AND POLYURETHANE PROPELLANTS

STATEMENT OF GOVERNMENT INTEREST

The invention described herein may be manufactured and used by or for the Government for governmental purposes without the payment of any royalty thereon.

BACKGROUND OF THE INVENTION

This invention relates to a catalytic system for polyurethane propellants. More particularly, this invention relates to novel ferric catalyst for use in promoting the cure of polyurethane propellant compositions.

Prior to the present invention, a considerable research effort has evolved in an attempt to develop catalysts for promoting the cure of urethane based propellants.

Such propellants conventionally comprise a mixture of an inorganic oxidizer component, such as ammonium perchlorate, dispersed in a matrix of a polyurethane resin which acts as both a fuel and binder component. Other conventional additive materials, such as plasticizers, burning rate modifiers, anti-oxidants, wetting agents, anti-foaming agents, etc., may be employed if desired.

The curing of these propellant compositions generally takes place at temperatures ranging from about 110° to 135° F. Such high temperatures, however, often create problems of stress and strain in case bonded rocket motors. The use of lower cure temperatures in the range of 70° to 80° F would significantly reduce propellant bore strains and bond stresses in the case bonded rocket motors. A satisfactory balance between potlife and the time required for effecting a full cure is also a problem of curing polyurethane propellants at room temperature during which the accelerating effect of higher temperatures on the urethane reaction cannot be utilized. This is especially true in the case of lithium initiated, hydroxy terminated polybutadien (LiHTPB) prepolymers cures with a diisocyanate such as hexamethylene diisocyanate (HDI).

One catalyst which has been suggested for use in curing urethane propellants is ferric acetylacetonate [Fe(AA)$_3$]. At catalyst levels as low as 0.001 percent Fe(AA)$_3$, however, the propellant mix will be castable for only 30 minutes in case of HDI and somewhat longer for toluene diisocyanate (TDI) cured propellants but still requires 7-10 days for full cure. In the absence of a catalyst, the LiHTPB propellants are practically uncurable (weeks at 180° F are required). Reduction of the catalyst level below 0.001 percent entails the danger of losing the catalyst in degradative reactions.

With the present invention, however, there has been found a number of ferric compounds that can be effectively employed as a catalyst for promoting the isocyanate-hydroxy curing reaction at room temperature under the conditions encountered in a solid propellant environment. In addition, mechanical processing characteristics, mechanical behavior and storage stability are not adversely affected.

SUMMARY OF THE INVENTION

In accordance with this invention, there is provided a group of novel ferric catalysts that are effective in promoting the room temperature cure of polyurethane propellants which still maintain a satisfactory balance between potlife and the time required for a full cure in the cure catalysis of polyurethane based propellant compositions. The catalysts of the invention are compounds of the type $FE(AA)_2X$, where AA is the acetylacetonate radical and X is an acid radical. These compounds were derived from $Fe(AA)_3$ by substituting one acetylacetonate ligand with an acid radical to yield compounds of the type $Fe(AA)_2X$.

Accordingly, the primary object of this invention is to provide a novel group of catalysts for use in promoting the room temperature cure of polyurethane propellants.

Another object of this invention is to provide a catalyst that can promote the room temperature cure of polyurethane propellants and still maintain a satisfactory balance between potlife and the time required to achieve a full cure.

Still another object of this invention is to provide a catalyst that promotes the room temperature cure of polyurethane propellants without adversely affecting the aging, mechanical properties and processing characteristics of these propellants.

The above and still other objects and advantages of the present invention will become more readily apparent upon consideration of the following detained description thereon.

DESCRIPTION OF THE PREFERRED EMBODIMENTS

Pursuant to the above defined objects, the present invention contemplates a group of novel ferric catalysts for promoting the cure of polyurethane propellant compositions. The primary problem in the cure of urethane propellants, utilizing such compounds as the hydroxy-terminated polybutadiene prepolymers (HTPB), is the achievement of adequate potlife in the presence of a catalyst, which will effect complete cure in a reasonable time. With a simple catalyst it is not possible to achieve this objective.

A good catalyst accelerates essentially the urethane reaction, i.e., the cure reaction proper, leaving side reactions like the water-isocyanate reaction comparatively unaffected. At higher levels of catalyst, therefore, the effects of side reactions are minimized and the overall state of cure and hence reproducibility as well as mechanical properties are improved.

The level of contaminants (moisture, etc.) in propellants may vary, depending on exposure to the environment and the characteristics of the propellant components which may not be known with the desired precision. While some of the contaminants may be neutralized by suitable scavengers, it is obviously good practice to minimize the cure time during which these substances can interfere with the urethane reaction. This cure time, unfortunately, must include a lengthy period, referred to as potlife (usually about 8 hours are required) during which the propellant batch must remain liquid in order to be cast into motor chambers. During this time, the propellant viscosity at all shear levels should not rise above 50,000 poise, to assure flaw-free castings.

HTPB prepolymers have about the highest reactivity of any hydroxyl containing compound. Thus, in order to obtain the desired potlife, the slower reacting isocyanates such as TDI, HDI, IPDI, (toluene diisocyanate, hexanedi-isocyanate, isophorone diisocyanate), etc. must be used. Aromatic isocyanates with unhindered NCO groups, or, even more so, electronegatively substituted isocyanates such as tetrafluoro-1,4-phenylene diisocyanate, are too fast, even uncatalyzed to be applicable.

Even less reactive isocyanates, require low concentrations of the more effective catalysts or the propellant potlife is undesirably short. Slightly higher concentrations of moderately active catalysts can be used. However, the catalyst which are best in promoting the urethane reaction are also the most active ones so that only very small catalyst concentrations are permissible. This poses an additional problem in that at low concentrations, the catalyst can be completely lost by hydrolysis or other degradative reactions.

With the present invention, however, it has been found that the aforementioned problems can be overcome by providing a novel group of ferric catalysts. It was discovered that combination of solutions of $FeCl_3$ and $Fe(AA)_3$ showed a minimum activity at a composition corresponding to $Fe(AA)_2Cl$. Simultaneously, a solubility minimum allowing isolation of the compound was obtained. The same test carried out with combinations of solutions of ferric octoate and $Fe(AA)_3$ gave a maximum activity at $Fe(AA)_2$ $OOCC_7H_{15}$. The rates were obtained by the exotherm method in butanol and are shown in Table I. It is, however, possible to isolate only the compounds made with strong acids. If the radical of a weak acid replaces one acetylacetonate ligand, attempts to isolate the compound failed, but their presence can be established in solution. Thus, $Fe(AA)_3$-$Fe(OOCC_7H_{15})_3$ shows an activity maximum at a composition of the mixture corresponding to $Fe(AA)_2$-$(OOCC_7H_{15})$ (Table I). Since it was hypothesized that these compounds may be valuable catalysts, a total of seven were prepared by the modification of $Fe(AA)_3$. The methods of preparation used one of the two following general reactions to accomplish the indicated change.

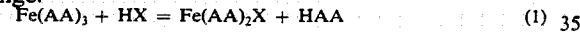

$$Fe(AA)_3 + HX = Fe(AA)_2X + HAA \quad (1)$$

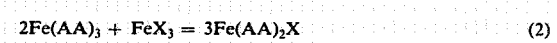

$$2Fe(AA)_3 + FeX_3 = 3Fe(AA)_2X \quad (2)$$

The proportions reacted are shown in Table II.

The free acids used were p-toluenesulphonic acid monohydrate, benzilic acid, chloroacetic acid, o-cresol, 8-hydroxyquinoline, and mandelic acid. $Fe(AA)_3$ and an appropriate amount of HX were mixed and dissolved in xylene. The solution was heated to remove about half of the xylene and to carry off the HAA produced. Hexane was added to precipitate the product. The product was filtered, washed, and dried before use. No chemical analyses were made, but the DSC thermogram was determined.

Only $Fe(ClO_4)_3 \cdot 6H_2O$ and $FeCl_3$ were available to produce compounds according to reaction 2. A benzene solution containing appropriate amounts of the $FeX_3$ and $Fe(AA)_3$ was evaporated on a hot plate to remove water. Then hexane was added and the compound formed isolated as above.

DSC thermograms were obtained with from 3-9 mg of material at a heating rate of 10 or 20° K=min. The data are reported in Table II.

Four of the compounds derived through the acid modification of $Fe(AA)_3$, namely, ferric bis(acetylacetonato) chloride, $Fe(AA)_2Cl$, ferric bis(acetylacetonato) perchlorate, $Fe(AA)_2ClO_4$, ferric bis(acetylacetonato) mandelate, $Fe(AA)_2OOC$-$CHOHC_6H_5$, and ferric bis(acetylactonato)p-toluenesulfonate were tested in propellants, the mechanical properties of which are shown in Table III. In these propellants, 0.2 millimoles HAA/400g propellants were used as suppressor. Dibutyltin dilaurate is included for comparison. All of these propellants with the exception of the one containing $Fe(AA)_2Cl$ catalyst had adequate (8 hrs) potlife. Since cure proceeded slowly, the amount of HAA was cut back to 0.15 millimoles HAA. With the exception of the $Fe(AA)_2Cl$ catalyst, potlife was still satisfactory. The data for the latter propellants are presented in Table IV. As shown in Tables III and IV, these catalysts yield propellants with mechanical properties equivalent to other ferric catalysts. In addition, they are water soluble, in contrast to $Fe(AA)_3$, and may therefore be useful for some special applications where water solubility is desirable.

TABLE I

Relative Catalytic Efficiency of $FeCl_3$-$Fe(AA)_3$ and $Fe(Octoate)_3$-$Fe(AA)_3$ Mixtures in the Reaction Between Methanol and HDI at 25° C

| Molar Ratio of Catalysts | Relative Rate of $FeCl_3$/$Fe(AA)_3$ System | Relative Rate of Fe Octoate/$Fe(AA)_3$ System |
|---|---|---|
| 10/0 | 1.47 | 0.105 |
| 9/1 | 1.28 | 0.29 |
| 8/2 | 1.04 | 0.56 |
| 7/3 | 0.71 | 0.72 |
| 6/4 | 0.47 | 1.02 |
| 5/5 | 0.33 | 1.14 |
| 4/6 | 0.25 | 1.32 |
| 3/7 | 0.24 | 1.46 |
| 2/8 | 0.40 | 1.38 |
| 1/9 | 0.52 | 1.34 |
| 0/10 | 1.00 | 1.00 |

TABLE II

| REACTION PROPORTIONS AND DSC DATA FOR MODIFIED $Fe(AA)_3$ CATALYSTS | | | | | | | |
|---|---|---|---|---|---|---|---|
| Compounds | 1 | 2 | 3 | 4 | 5 | 6 | 7 |
| $Fe(AA)_3$ | 3.33 | 4.5 | 3.66 | 5.08 | 4.89 | 4.34 | 4.36 |
| $Fe(ClO_4)_3 \cdot 6H_2O$ | 2.18 | — | — | — | — | — | — |
| $CH_3C_6H_4SO_3H \cdot H_2O$ | — | 2.24 | — | — | — | — | — |
| $(C_6H_5)_2COHCOOH$ | — | — | 2.37 | — | — | — | — |
| $CH_2ClCOOH$ | — | — | — | 1.36 | — | — | — |
| $CH_3C_6H_4OH$ | — | — | — | — | 1.50 | — | — |
| $C_7H_6NOH$ | — | — | — | — | — | 1.82 | — |
| $C_6H_5CHOHCOOH$ | — | — | — | — | — | — | 1.89 |
| DSC Data | | | | | | | |
| Endotherms, ° C | 109 | 168 | 170 | — | 187[b] | 170[c], 227 | — |
| Exotherms, ° C | — | — | —[a] | 185 | — | — | — |

[a]Exotherm immediately after endotherm
[b]No depression with $Fe(AA)_3$
[c]Same endotherm occurs in mixture with $Fe(AA)_3$

TABLE III

NEW IRON CATALYSTS TESTED IN 85 WT% PROPELLANTS
(Primary HTPB Lot 242AM310/HDI)

| Catalyst[b] | | Uniaxial Tensile Properties at 77° F[a] - Cure at Ambient | | | | | | | | | | |
|---|---|---|---|---|---|---|---|---|---|---|---|---|
| | | 6 days | | | 14 days | | | 20 days | | | 30 days | | |
| | | $\sigma_m$, psi | $\epsilon_m$, % | $E_o$, psi | $\sigma_m$, psi | $\epsilon_m$, % | $E_o$, psi | $\sigma_m$, psi | $\epsilon_m$, % | $E_o$, psi | $\sigma_m$, psi | $\epsilon_m$, % | $E_o$, psi |
| Fe(AA)$_2$Cl | 0.0025% | 86 | 81 | 295 | 140 | 47 | 613 | 165 | 45 | 721 | 177 | 45 | 840 |
| Fe(AA)$_2$ClO$_4$ | 0.0025% | 20 | 66 | 149 | 102 | 80 | 390 | 140 | 73 | 541 | 156 | 71 | 570 |
| Fe(AA)$_2$OCOCHOHC$_6$H$_5$ | 0.0025% | 31 | 80 | 198 | 123 | 75 | 480 | 151 | 58 | 622 | 162 | 40 | 720 |
| Fe(AA)$_2$ PTS | 0.0025% | — | — | — | 97 | 84 | 390 | 118 | 80 | 440 | 133 | 85 | 420 |
| Dibutyltin dilaurate[c] | | 27 | 92 | 169 | 101 | 94 | 363 | 135 | 75 | 488 | 158 | 75 | 600 |

[a] Standard JANNAF tensile specimens, $\epsilon = 0.74$ min$^{-1}$
[b] Catalyst system includes 0.2 millimoles HAA/400g propellant, and 0.1% ZnO
[c] 0.0025%; 0.25 mmoles linoleic acid, 0.1% ZnO

TABLE IV

NEW IRON CATALYSTS TESTED IN 85 WT% PROPELLANTS
(HTPB Lot 242AM310 Cured With HDI)

| Catalyst[b] | | Uniaxial Tensile Properties[a] at 77° F Cure at Ambient | | | | | | | | |
|---|---|---|---|---|---|---|---|---|---|---|
| | | 7 days | | | 12 days | | | 28 days | | |
| | | $\sigma_m$, psi | $\epsilon_m$, % | $E_o$, psi | $\sigma_m$, psi | $\epsilon_m$, % | $E_o$, psi | $\sigma_m$, psi | $\epsilon_m$, % | $E_o$, psi |
| Fe(AA)$_2$Cl | 0.0025% | 123 | 58 | 457 | 140 | 42 | 591 | 155 | 39 | 785 |
| Fe(AA)$_2$ClO$_4$ | 0.0025% | 60 | 86 | 171 | 106 | 76 | 594 | 128 | 66 | 576 |
| Fe(AA)$_2$OCOCHOHC$_6$H$_5$ | 0.0025% | 88 | 98 | 299 | 142 | 59 | 594 | 165 | 47 | 791 |
| Fe(AA)$_2$O$_3$SC$_6$H$_4$CH$_3$ | 0.0025% | — | — | — | 86 | 86 | 319 | 140 | 66 | 600 |

[a] Standard JANNAF tensile specimen; $\epsilon = 0.74$ min$^{-1}$
[b] Catalyst system includes 0.15 mmoles HAA and 0.1% ZnO Although the invention has been described by reference to particular embodiments, it is to be understood by those skilled in the art that all the various modifications that are encompassed within the scope of the appended claims are intended to be included herein.

What is claimed is:

1. In a propellant composition comprising:
   a. an oxidizer component;
   b. a polyurethane fuel component; and
   c. the improvement comprising as a curing catalyst a ferric compound selected from the group consisting of ferric bis(acetylacetonato) chloride, ferric bis(acetylacetonato) perchlorate, ferric bis(acetylacetonato) mandalate, and ferric bis(acetylacetonato) p-toluenesulfonate.

2. A propellant composition in accordance with claim 1 wherein said curing catalyst is ferric bis(acetylacetonato) chloride.

3. A propellant composition in accordance with claim 1 wherein said curing catalyst is ferric bis(acetylacetonato) perchlorate.

4. A propellant composition in accordance with claim 1 wherein said curing catalyst is ferric bis(acetylacetonato) p-toluenesulfonate.

* * * * *